United States Patent
Wingrove et al.

(10) Patent No.: US 7,801,256 B2
(45) Date of Patent: Sep. 21, 2010

(54) METHOD AND APPARATUS TO CANCEL INTERFERENCE OVER A GROUP OF SIGNALS

(75) Inventors: Michael Wingrove, Kanata (CA); Michael Dziawa, Richmond (CA); Ian Dublin, Nepean (CA)

(73) Assignee: Ciena Corporation, Linthicum, MD (US)

( * ) Notice: Subject to any disclaimer, the term of this patent is extended or adjusted under 35 U.S.C. 154(b) by 1080 days.

(21) Appl. No.: 11/450,341

(22) Filed: Jun. 12, 2006

(65) Prior Publication Data

US 2007/0286295 A1    Dec. 13, 2007

(51) Int. Cl.
*H03D 1/06* (2006.01)
(52) U.S. Cl. .................. 375/346; 375/316; 375/219; 375/257; 455/569; 455/570
(58) Field of Classification Search .................. 375/346, 375/316, 219, 257; 379/388, 410; 455/569, 455/570

See application file for complete search history.

(56) References Cited

U.S. PATENT DOCUMENTS

2007/0046389 A1* 3/2007 Dreps et al. .................. 333/1

* cited by examiner

*Primary Examiner*—David C Payne
*Assistant Examiner*—Zewdu Kassa
(74) *Attorney, Agent, or Firm*—Merek, Blackmon & Voorhees, LLC

(57) ABSTRACT

A system and method for canceling interference over a group of signals. One or more wires in a group of wires are designated to carry one or more reference signals. The one or more reference signals are used to cancel interference from the data carrying signals in the group of signals. Preferably, the one or more reference signals are subtracted from the data carrying signals to cancel interference from the data carrying signals. Analog or digital elements can be used to subtract the one or more reference signals from the data carrying signals. For example, an operation amplifier or a DSP may be used to perform the subtraction. Filters may be used to further adapt the one or more reference signals prior to the subtracting step to optimize interference cancellation. The filters may be either digital or analog.

17 Claims, 7 Drawing Sheets

METHOD AND APPARATUS TO CANCEL INTERFERENCE OVER A GROUP OF SIGNALS

FIELD OF THE INVENTION

The present invention relates generally to devices that transmit groups of signals from one point to another. More particularly the present invention is directed to a method and apparatus for canceling interference in the form of cross talk between banks and/or inter-bank cross talk.

BACKGROUND OF THE INVENTION

In many forms of electronic equipment, signals are communicated between groups of plug in modules in either analog and/or digital formats over a collection of electrical conductors commonly referred to as a backplane. Historically, this group of signals has consisted of N information carrying signals combined with a single return or ground signal. In these types of systems, the transmission performance is limited by a variety of cross talk mechanisms between conductors. For example, mutual inductance, mutual capacitance and ground noise or ground bounce all provide mechanisms for one signal to interfere with one or more other signals. Also, single ended conductors may be particularly susceptible to coupling of external noise sources such as interference from nearby radio transmitters.

FIG. 1, depicts a conventional legacy shelf. The legacy shelf or dual channel bank includes bank A having forty-eight line cards and bank B having forty-eight line cards. Six wires A1 through A6 connect the line cards in bank A to a common card C. Similarly, six wires B1 through B6 connect the lines card in bank B to the common card C. The line cards receive the signals with respect to ground. FIG. 2 depicts ground noise or ground bounce that occurs due to the configuration of the legacy shelf. In addition to ground noise or ground bounce, the signals on each of the six wires in banks A and B experience interference from the other wires in a given bank. This interference or inter-bank cross talk can be coupled onto the signals carried by each of the wires in a given bank as a result of parasitic circuit elements. These parasitic elements result from the physical implementation of a system. For example, two printed circuit traces running next to each other will have a certain amount of both parasitic capacitance and parasitic mutual inductance that allows the signal on one trace to interfere with the signal on the other trace and vice a versa. Typically, a given system is designed to limit the parasitics through careful choice of signal spacing, trace widths, board materials, etc. Since there is a cost associated with controlling the parasitics of a given system, the system is designed to only limit the parasitics just enough for a particular application. However, a significant problem arises when it is necessary for a system to meet a new application. For example, when it is necessary to have the system carry higher frequency signals and thus a higher data rate than that for which it was originally designed the system is ill equipped as the parasitic coupling increases with frequency. More specifically, the prior design simply does not adequately compensate for the increase in parasitic coupling due to the increase in frequency. One aspect of the present invention is designed to address this problem without substantially altering various aspects of the system, e.g., signal spacing, trace widths, board materials, etc.

In previously known systems utilizing higher signal bandwidths, differential transmission has been employed whereby a signal is transmitted on one half of a tightly coupled pair of conductors and the negative version of the signal is transmitted on the second half of the pair. This type of system is disadvantageous as nearly twice as many signal wires are required to transmit the same number of streams of information. This associated disadvantage is particularly exacerbated when it is desired to increase the capacity of an existing backplane. In this case, it is desirable for a solution to operate without any changes in the physical backplane, even when such changes could very well improve the transmission capacity.

In another known approach, highly advanced signal processing techniques referred to as multi-user detection and iterative interference cancellation may be employed to separate the signals. These techniques are complex and require large amounts of computation to separate the signals. Thus, this approach may be unacceptable in applications where tight cost or power budgets must be met.

OBJECTS AND SUMMARY OF THE INVENTION

It is an object of a preferred embodiment of the present invention to obviate or mitigate at least some of the above-mentioned disadvantages of traditional methods and devices employed to transmit a group of signals.

It is another object of a preferred embodiment of the present invention to provide a method and system to cancel interference (e.g. ground bounce or noise, parasitic mutual inductance and/or parasitic capacitance) over a group of signals.

It is a further object a preferred embodiment of the present invention to cancel interference over a group of signals without substantially altering the backplane connecting the transmitting element and the receiving element.

It is yet a further object of a preferred embodiment of the present invention to readily adapt electronic equipment so that the electronic equipment can handle higher frequency signals and thus higher data rates as well as handle the increase in interference attendant the higher frequency signals.

Still a further object of a preferred embodiment of the present invention is to cost-effectively modify a legacy shelf to handle higher frequency signals and thus higher data rates as well as handle the increase in interference attendant the higher frequency signals.

Yet still a further object of a preferred embodiment of the present invention is to provide a configuration that will allow a legacy shelf or similar elements to switch from a state in which the legacy shelf handles lower frequency signals to a state in which the legacy shelf handles higher frequency signals and thus higher data rates as well as handle the increase in interference attendant the higher frequency signals.

A further object of a preferred embodiment of the present invention is to provide a method and system that allows existing equipment to be cost effectively retrofitted to handle higher frequency signals and thus higher data rates as well as handle the increase in interference attendant the higher frequency signals.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a method for canceling interference on one or more information carrying signals transmitted over one or more of a plurality of wires. The method comprises the steps of: (a) selecting a reference wire from one of the plurality of wires to carry a reference signal, the reference wire being separate and distinct from a ground path; (b) transmitting a reference signal over the reference wire; (c) selecting an information carrying signal wire from one of the plurality of wires, the information carrying signal wire is a wire other than the reference wire; (d) transmitting an information carrying signal over the information carrying signal wire; and, (e) using the reference signal transmitted over the reference wire to cancel interference from the information carrying signal transmitted over the information carrying signal wire.

Another preferred embodiment of the present invention is directed to a method of retrofitting a system to carry information at faster data rates than the system was at some prior point in time designed to accommodate. The system includes a common card, a plurality of lines cards and a bus having a plurality of wires in parallel for connecting the common card to the plurality of line cards. The method comprises the step of: (a) designating one of the plurality of wires previously used to carry an information carrying signal to be a reference wire for carrying a reference signal, the reference wire being separate and distinct from a ground path; and, (b) reconfiguring the system to use the reference signal to cancel interference on one or more information carrying signals.

A further preferred embodiment of the present invention is directed to a system for canceling interference on information carrying signals transmitted between a common card and a plurality of line cards over a bus having a plurality of wires in parallel. The system includes a common card, a plurality of line cards and a bus connecting the common card to the plurality of line cards. The bus includes a plurality of wires in parallel. At least one of the plurality of wires is a reference wire for carrying a reference signal between the common card and the plurality of line cards. The reference wire is separate and distinct from a ground path. At least one of the plurality of wires is an information carrying signal wire for carrying an information carrying signal between the common card and at least one of the plurality of line cards. The information carrying signal wire is a wire other than the reference wire. The system further includes means for subtracting the reference signal transmitted over the reference wire from the information carrying signal transmitted over the information carrying signal wire to cancel interference from the information carrying signal.

The foregoing summaries are of preferred forms of the present invention. The scope of the present invention is in no way limited to these preferred forms.

DETAILED DESCRIPTION OF THE PREFERRED EMBODIMENTS

A preferred form of the invention will be described with reference to FIGS. 3, 4, 5B and 6. The appended claims are not limited to the preferred forms and no term and/or phrase used herein is to be given a meaning other than its ordinary meaning unless it is expressly stated that the term and/or phrase shall have a special meaning.

Figure 1:
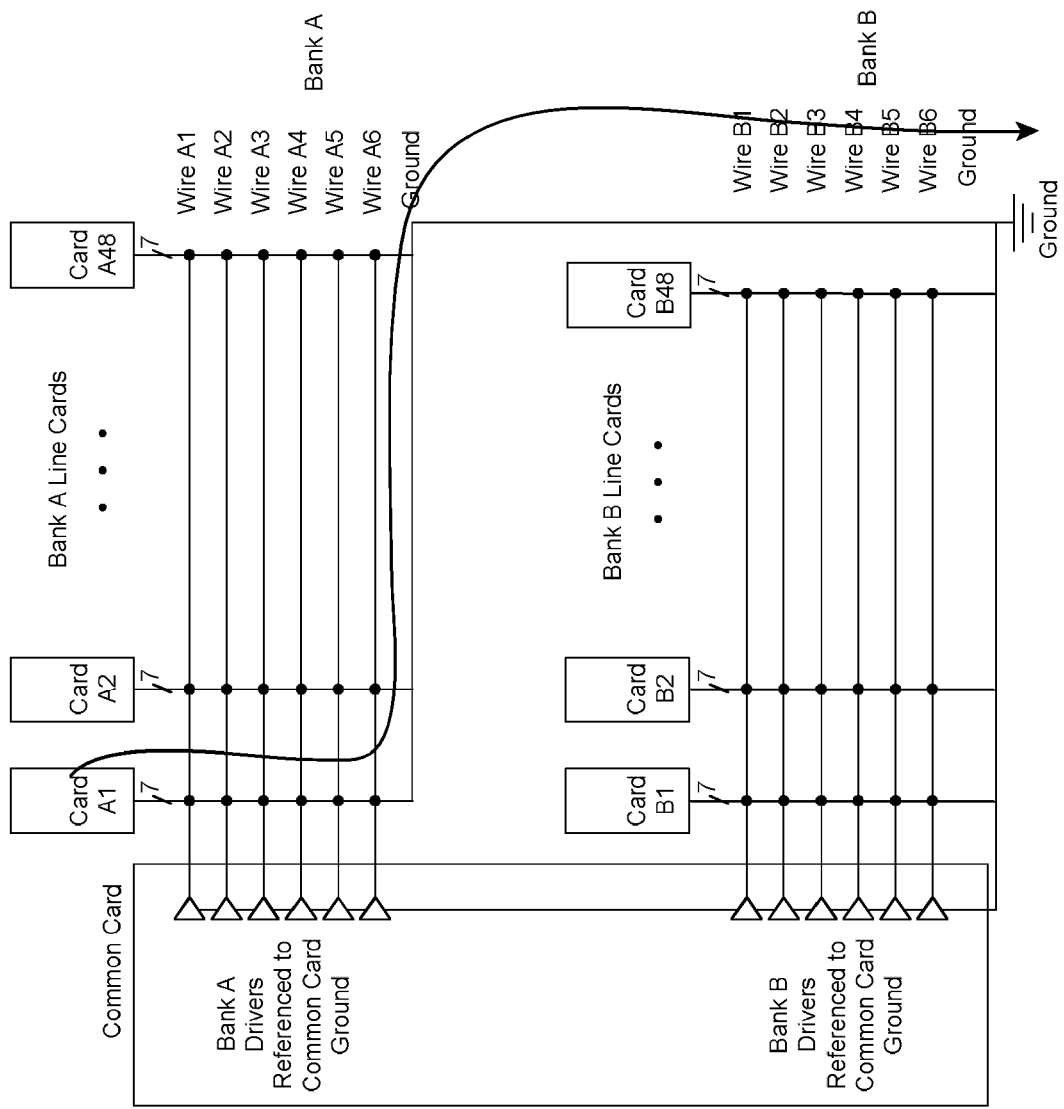
FIG. 1 is a schematic of a conventional legacy shelf.
Figure 2:
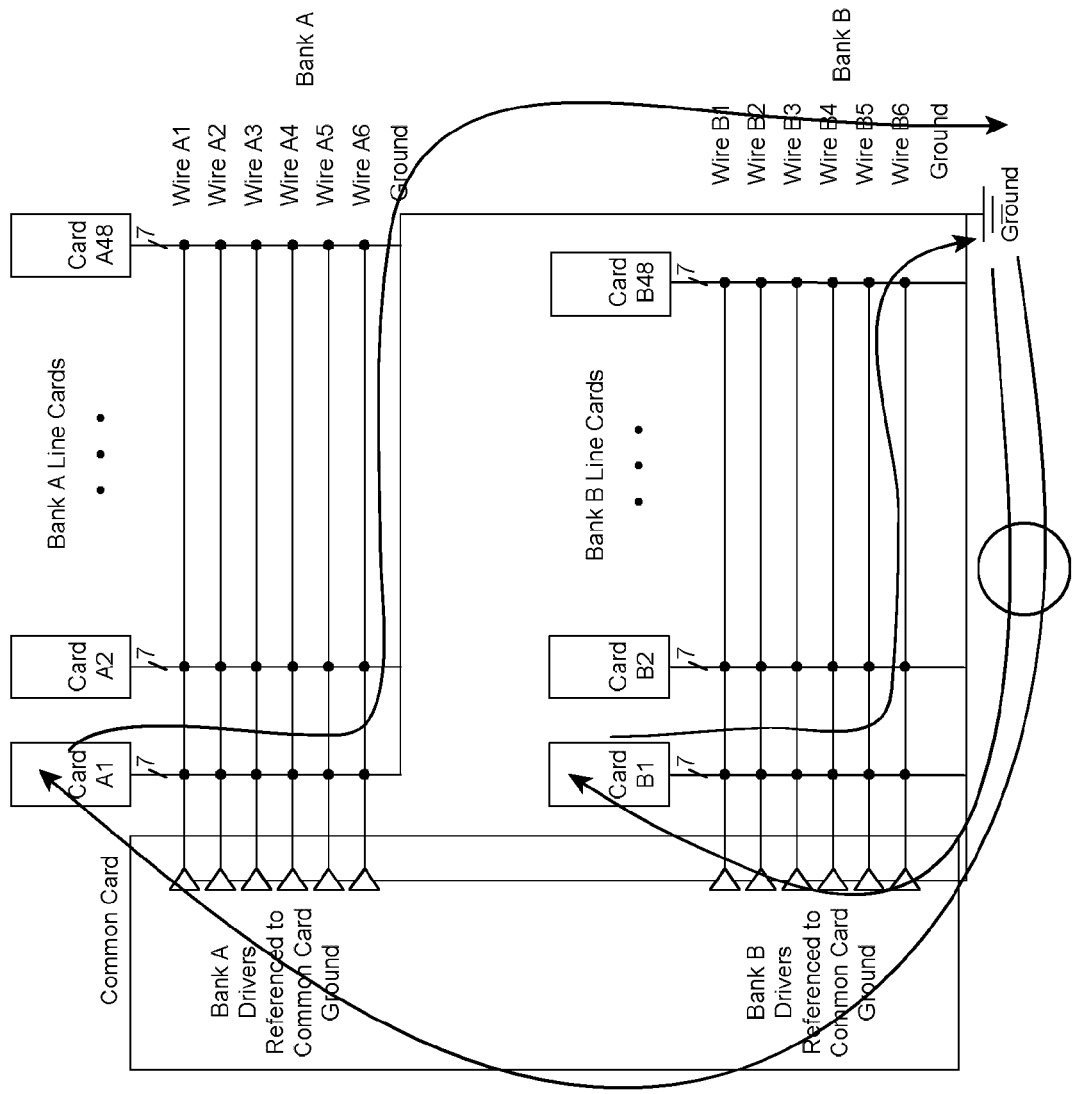
FIG. 2 is a schematic of the legacy shelf depicted in FIG. 1 further illustrating ground bounce cross talk.
Figure 3:
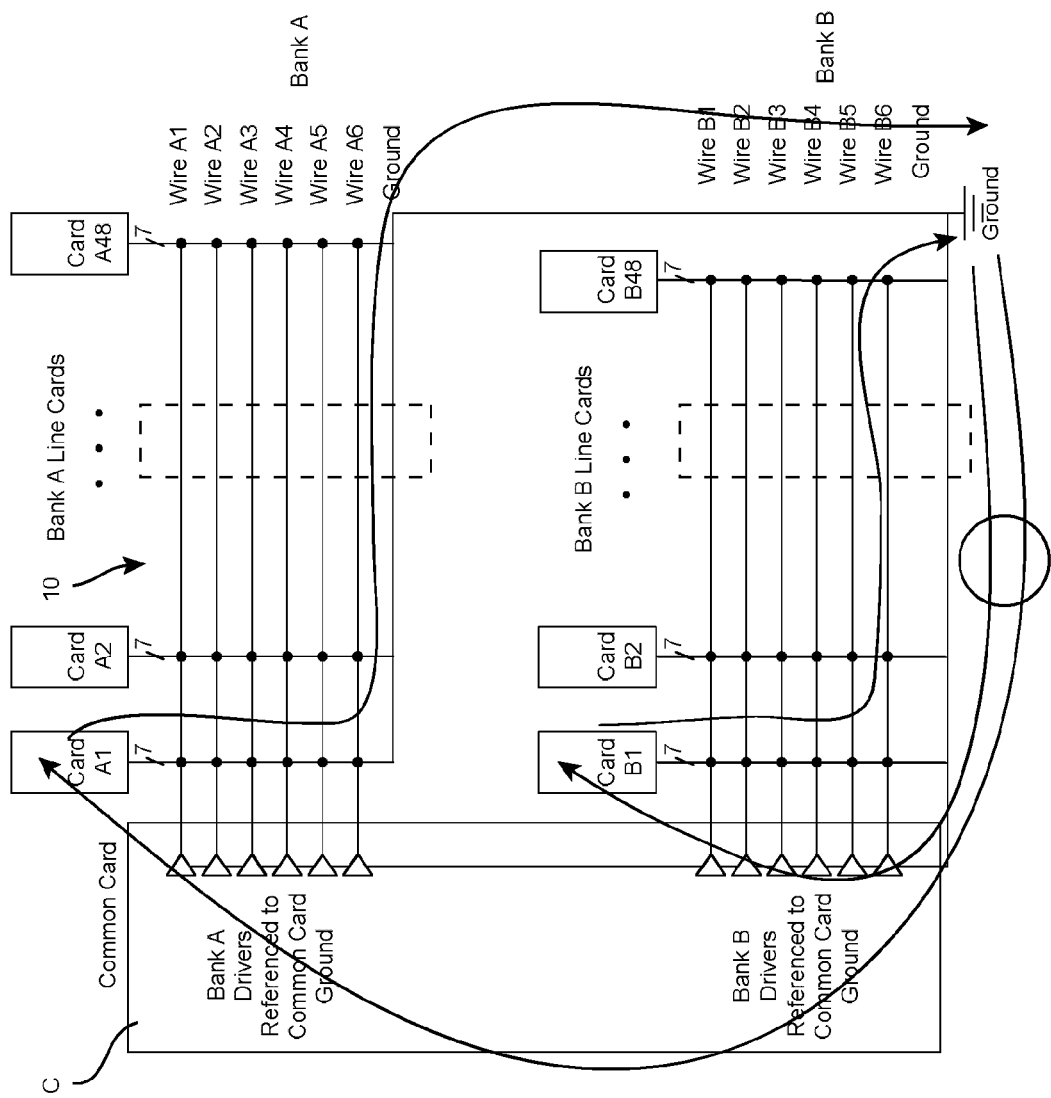
FIG. 3 is a schematic of a legacy shelf modified in accordance with a preferred embodiment of the present invention to reduce the effect of ground bounce cross-talk as well as cross talk within a bank.
Figure 4:
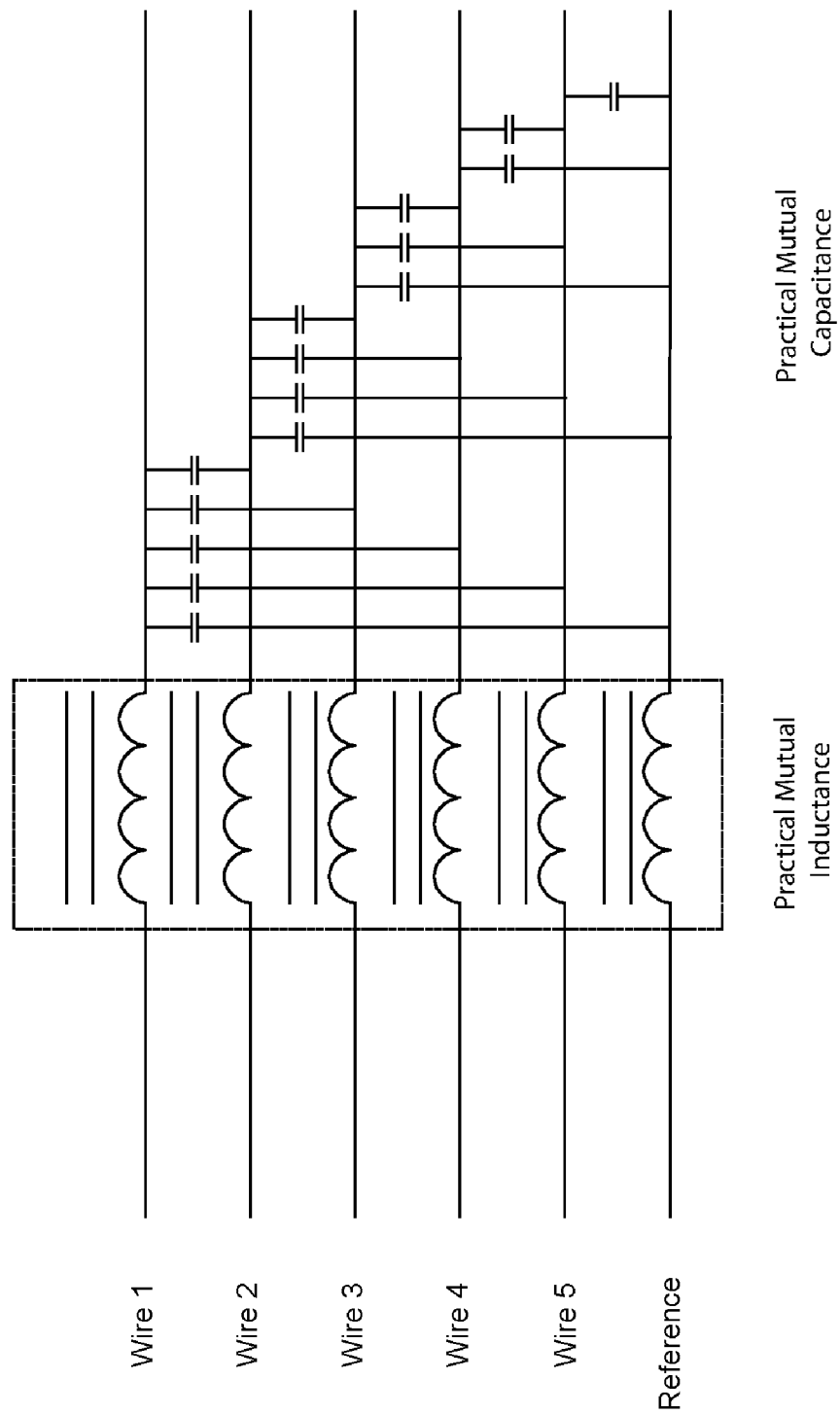
FIG. 4 is a schematic illustration of the parasitic coupling between the data carrying wires 1 to 5 and reference wire 6.

FIG. 3 depicts one of numerous environments in which the preferred forms of the present invention may be utilized. FIG. 3 depicts a legacy system modified in accordance with a preferred embodiment of the present invention. The legacy shelf or dual channel bank 10 includes two banks A and B. Each bank typically includes forty-eight line cards. Line cards A1 through A48 are connected to common card C via wires A1 through A5 and reference wire AR. Line cards B1 through B48 are connected to common card C via wires B1 through B5 and reference wire BR. The common card's ground reference is modulated by return currents for banks A and B passing through the ground conductor impedance as depicted in FIG. 3. This ground bounce introduces cross talk between bank A and bank B. As explained below, this preferred form of the present invention is designed to cancel (i.e., eliminate or reduce) this ground bounce. FIG. 4 depicts the cross talk (i.e., parasitic mutual capacitance and parasitic mutual inductance that occurs within a bank. This preferred form of the present invention is designed to cancel this type of cross talk within the banks A and B.

Figure 5B:
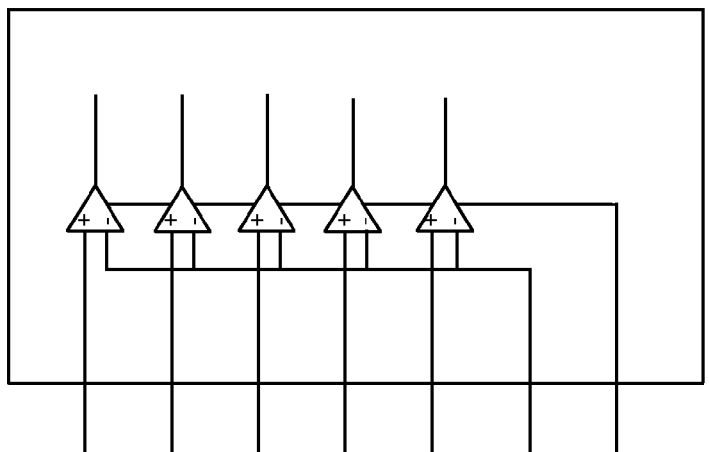
FIG. 5B is a schematic illustration of the line card receiver architecture in accordance with a preferred embodiment of the present invention.
Figure 5A:
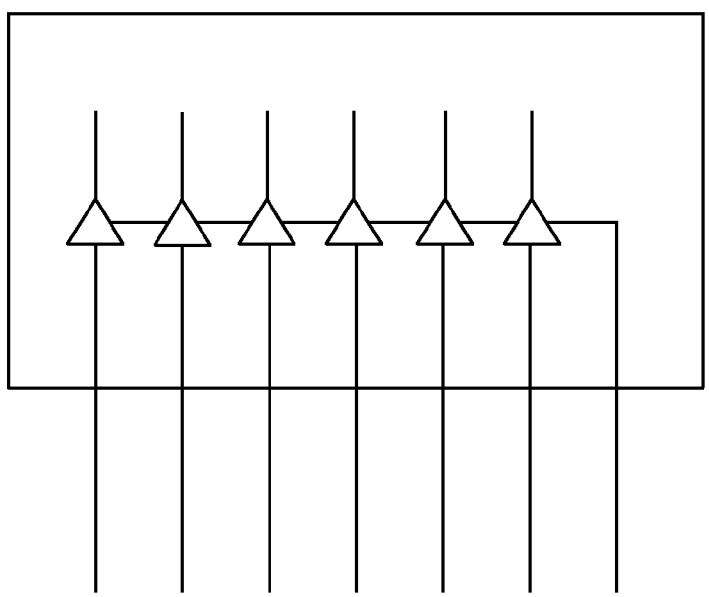
FIG. 5A is a schematic illustration of the line card receiver architecture of a conventional legacy system.

As previously explained, ground bounce, parasitic mutual capacitance and parasitic mutual inductance are coupled onto the signals. If the ground bounce, parasitic mutual capacitance and parasitic mutual inductance are the same for the reference wire and the other information carrying wires in a given bank, then these forms of interference can be cancelled by subtracting the reference signal from each of the information carrying signals at the receiver of the line card. FIG. 5B shows one preferred form of line card 20 for accomplishing this subtraction. In this embodiment, the reference signal and the data carrying signals are analog signals. Further, the subtracting elements 30 (e.g. operational amplifiers) are analog circuit elements. This architecture allows the return currents to flow through ground, but the signals are received with respect to the reference signal via a typical differential receiver. This is in contrast to the conventional legacy line card architecture 25 depicted in FIG. 5A in which the signals are received with respect to ground.

In this embodiment, reference wire RA has been designated to be a reference as opposed to the typical configuration of a legacy shelf in which it is an information carrying signal. Because of the unintended nature of the parasitic couplings, it is possible that the coupling on the data signals and the reference signal will not be exactly the same. One manner of dealing with this difference in couplings on the reference signal and the data signals is to analyze the magnitude and phase of the parasitic coupling between the data signals and other sources of interference and choose as the reference signal the signal that best matches the parasitic coupling on the other signals in an average sense. In some applications, this selection process may alone be enough to cancel the undesired cross talk without further treatment of the signals. This selection process can be based on laboratory measurements (offline) or performed automatically (online), for example, each time the system is powered up. The online approach may be found more useful when it is expected that the parasitics may vary significantly from one system to another.

If further processing of the reference signal is required to reduce the difference in parasitic couplings on the data signals and the reference signal, a filter may be used to filter the reference signal. Typically, each data signal will require its own filter. The filter may be either digital or analog. The filter functions to adjust the phase and amplitude of the reference signal to compensate for the differences in the parasitic coupling paths so that the filtered reference signal achieves better cancellation of the cross talk etc. The phase and magnitude response of the filters may be determined offline (e.g., in a laboratory via measurement and hand calculation) or online (e.g., via an adaptive technique).

Due to the fact that the interference and cross talk signals can consist of a mixture or combination of many different signals, it may be necessary to use more than one reference signal to achieve the desired cancellation.

Figure 6:
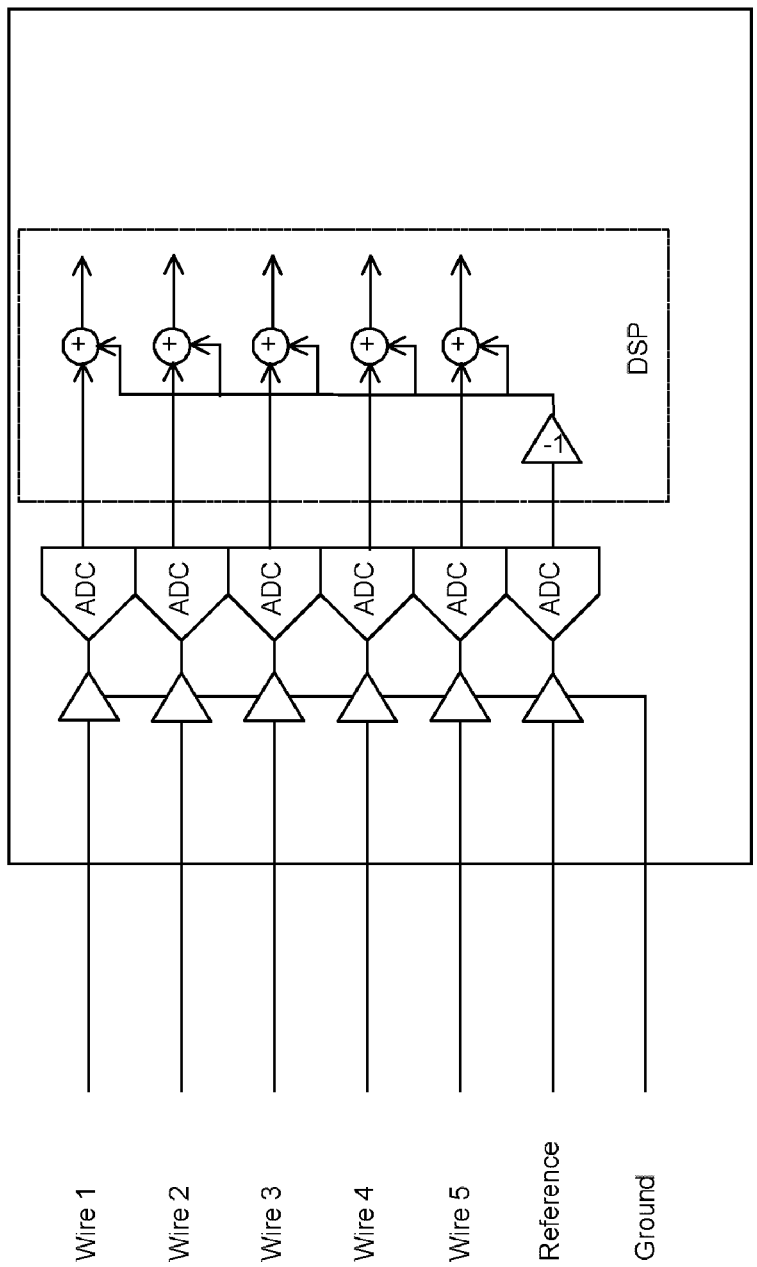
FIG. 6 is a schematic illustration of the line card receiver architecture of another preferred embodiment of the present invention.
Figure 7:
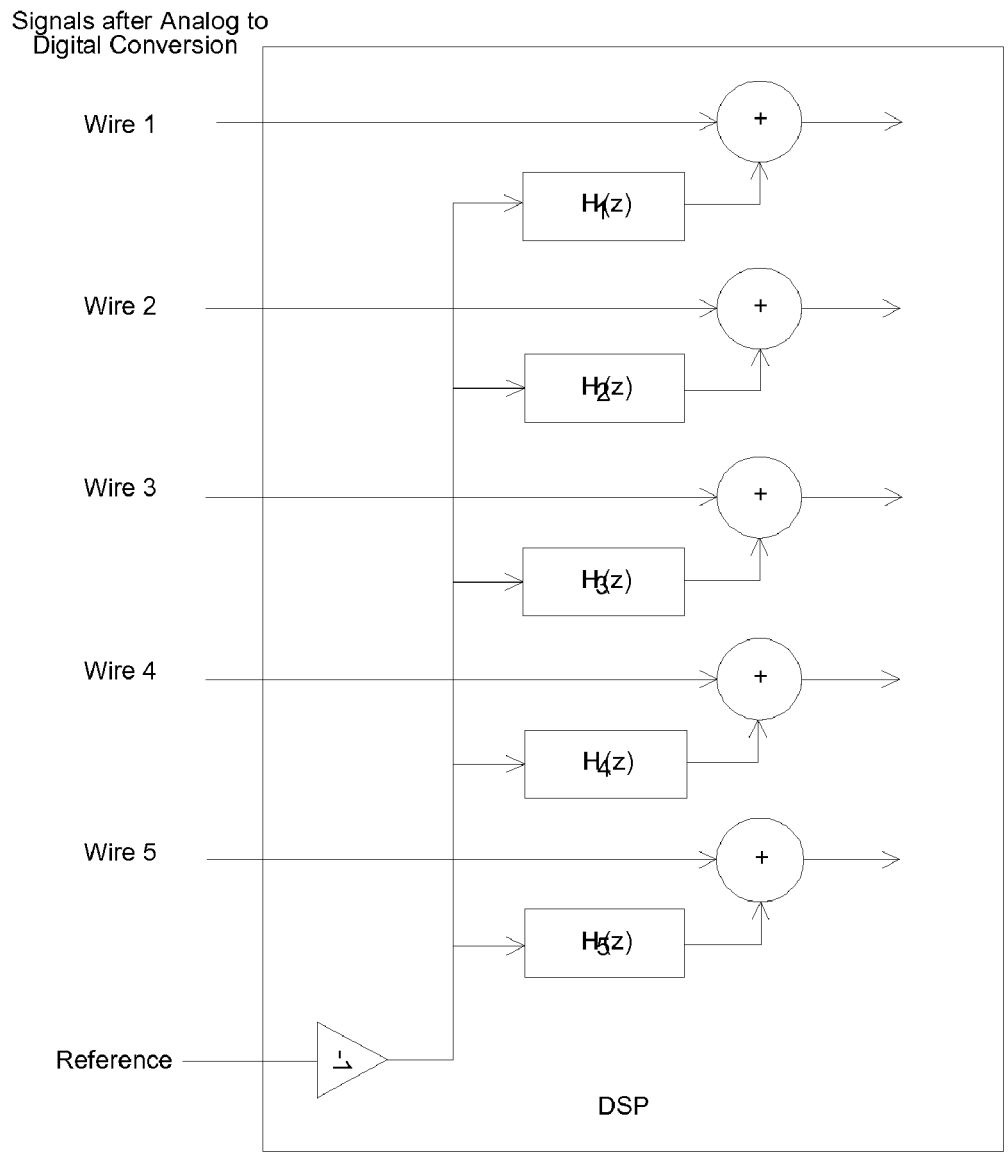
FIG. 7 is a schematic of the DSP depicted in FIG. 6 with the optional filters for filtering the reference signal for a given data carrying wire.

FIGS. 6 and 7 depict alternative configurations for line cards formed in accordance with the principles of the present invention. Referring to FIG. 6, the line card receiver 40 includes a plurality of analog to digital converters ADC, one for each of wires 1 to 5 and the reference wire. The subtraction of the reference wire from the data signals is performed by the DSP ("Digital Signal Processor") after the analog to digital conversion. This approach facilitates the preprocessing of the reference signal in order to more optimally cancel the cross talk interference. Another advantage of this approach is that the DSP function is easily reprogrammed to allow a single line card to operate in either the legacy mode or the mode of the preferred form of the present invention.

FIG. 7 illustrates a DSP having the optional filters. In this example, the filters are digital FIR ("Finite Impulse Response") filters. However, it will be readily appreciated that any suitable filter may be used. As previously explained, the filters may be adapted either offline or online to optimize the interference cancellation. For example, in the case of well balanced digital data the well known LMS ("Least Mean Square") algorithm may be used to adapt the filters in either decision directed or data directed mode.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A method for canceling interbank interference on one or more information carrying signals transmitted over a card, said method comprising the steps of:
   (a) providing a multiple channel bank having at least two banks of line cards and a common card;
   (b) each said bank of line cards connected to each other through a common card by a plurality of parallel data wires and a ground path;
   (c) selecting a reference wire from one of said plurality of data wires to carry a reference signal, said reference wire being separate and distinct from a ground path;
   (d) transmitting a reference signal over said reference wire;
   (e) selecting an information carrying signal wire from one of said plurality of data wires, said information carrying signal wire is a wire other than said reference wire;
   (f) transmitting an information carrying signal over said information carrying signal wire; and
   (g) using said reference signal transmitted over said reference wire to cancel interference from said information carrying signal transmitted over said information carrying signal wire; further including the step of: (a) subtracting said reference signal transmitted over said reference wire from said information carrying signal transmitted over said information carrying wire to cancel interference from said information carrying signal.

2. A method as recited in claim 1, further including the step of:
   (a) converting said information carrying signal and said reference signal from an analog signal to a digital signal prior to step (a) in claim 1.

3. A method as recited in claim 2, wherein:
   (a) subtracting said reference signal from said information carrying signal after step (a) in claim 2 using digital signal processing.

4. A method as recited in claim 1, further including the step of converting said information carrying signal and said reference signal from an analog signal to a digital signal prior to step (a) in claim 1 uses an operational amplifier.

5. A method as recited in claim 2, further including the step of:
   (a) filtering said reference signal prior to step (a) in claim 1 using one of a digital filter and an analog filter.

6. A method as recited in claim 5, further including the step of:
   (a) filtering said reference signal using a digital FIR filter.

7. A method as recited in claim 1, further including the steps of:
   (a) selecting first and second information carrying signal wires from said plurality of data wires, said first and second information carrying signal wires being wires other than said reference wire;
   (b) transmitting first and second information carrying signals over said first and second information carrying signal wires, respectively; and,
   (c) after steps (a) and (b) of this claim, subtracting said reference signal from each of said first and second information carrying signals to cancel interference from said first and second information carrying signals.

8. A method as recited in claim 7, including the further step of:
   (a) operably connecting a first filter to said first information carrying wire;
   (b) operably connecting a second filter to said second information carrying wire;
   (c) filtering said reference signal using said first filter prior to subtracting said reference signal from said first information carrying signal; and,
   (d) filtering said reference signal using said second filter prior to subtracting said reference signal from said second information carrying signal.

9. A method as recited in claim 1, further including the steps of:
   (a) selecting first and second reference wire from said plurality of data wires to carry first and second reference signals, said first and second reference wire being separate and distinct from a ground path; and,
   (b) using said reference signals transmitted over said first and second reference wires to cancel interference from said information carrying signal transmitted over said information carrying signal wire.

10. A method of retrofitting a system to carry information at faster data rates than the system was at some prior point in time designed to accommodate, the system includes a common card, a plurality of lines cards and a bus having a plurality of information carrying wires and a ground path in parallel for connecting said common card to said plurality of line cards, said method comprising the step of:
   (a) designating one of said plurality of wires previously used to carry an information carrying signal to be a reference wire for carrying a reference signal, said reference wire being separate and distinct from a ground path; and,
   (b) reconfiguring the system to use the reference signal to cancel interference on one or more information carrying signals; further including the step of: (a) subtracting said reference signal transmitted over said reference wire from at least one information carrying signal transmitted over another of said plurality of wires to cancel interference in the form of cross talk between two banks of a shelf as well as inter-bank cross talk in at least one of said two banks from said information carrying signal.

11. A method as recited in claim 10, further including the step of:
   (a) subtracting said reference signal transmitted over said reference wire from at least one information carrying signal transmitted over another of said plurality of wires to cancel interference from said information carrying signal.

12. A method as recited in claim 11, further including the step of:
   (a) prior to step (a) in claim 11, converting said reference signal and at least one information carrying signal from analog signals to digital signals.

13. A method as recited in claim 11, further including the step of:
   (a) prior to step (a) in claim 11, filtering said reference signal.

14. A system for canceling interference on information carrying signals transmitted between a common card and a plurality of line cards over a bus having a plurality of wires and a ground path in parallel, said system comprising:
   (a) a common card;
   (b) a plurality of line cards;
   (c) a bus connecting said common card to said plurality of line cards, said bus including a plurality of wires carrying data in parallel, at least one of said plurality of wires being a reference wire for carrying a reference signal between said common card and said plurality of line cards, said reference wire being separate and distinct from a ground path, at least one of said plurality of wires being an information carrying signal wire for carrying an information carrying signal between said common card and at least one of said plurality of line cards, said information carrying signal wire is a wire other than said reference wire; and,
   (d) means for subtracting said reference signal transmitted over said reference wire from said information carrying signal transmitted over said information carrying signal wire to cancel interference from said information carrying signal.

15. A system as set forth in claim 14, further including:
   (a) an analog to digital converter operably associated with said means for subtracting to convert said information carrying signal and said reference signal from analog signals to digital signals.

16. A system as recited in claim 15, wherein:
   (a) said means for subtracting includes a digital signal processor and at least one digital FIR filter.

17. A system as recited in claims 14, further including:
   (a) a shelf having two banks, each of said banks having a plurality of line cards, each of said lines cards further having means for subtracting said reference signal transmitted over said reference wire from said information carrying signal transmitted over said information carrying signal wire.

* * * * *